Oct. 13, 1942.  E. O. BLACKWELL  2,298,458
BLOCK MOLDING MACHINE
Filed July 19, 1939      6 Sheets-Sheet 1

Elie Owen Blackwell
INVENTOR

Oct. 13, 1942.    E. O. BLACKWELL    2,298,458
BLOCK MOLDING MACHINE
Filed July 19, 1939    6 Sheets-Sheet 2

INVENTOR

Oct. 13, 1942.	E. O. BLACKWELL	2,298,458
BLOCK MOLDING MACHINE
Filed July 19, 1939	6 Sheets-Sheet 3

INVENTOR

Patented Oct. 13, 1942

2,298,458

UNITED STATES PATENT OFFICE 2,298,458

BLOCK MOLDING MACHINE

Elie Owen Blackwell, Gainesville, Fla.

Application July 19, 1939, Serial No. 285,446

11 Claims. (Cl. 25—41)

This invention relates to machines for molding building blocks of plastic materials and has for its object to provide a machine that is simple in construction and efficient in operation and production of building blocks with which walls can be erected. This machine comprises five functional mechanisms, a vertical frame, a rotary molding cradle, a face-flange separator device, a vibrator tamping apparatus and a block releasing elevator. With this machine building blocks are molded at each operation, each block consisting a single face element back of which and integral thereto project flange elements at edges and a pilaster element intermediate its horizontal length, with which blocks both exterior and partition walls are erected each wall composing two sections that may be entirely separate and independent with a complete air chamber between to prevent heat and moisture from passing through wall which eliminates the necessity of furring and lathing and permits building structures of these blocks of a more permanent nature at an original cost within a lower range.

Another object of the invention is to provide a block molding machine, of the foregoing descriptions, with which building blocks are molded in a multiple of sizes at each operation, each of which blocks consists of a single face element back of which and integral thereto project flange elements at edges and a pilaster element intermediate its horizontal length with key-way depressions in its ends, with which blocks both exterior and partition walls are erected each wall composing two sections that may be entirely separate and independent and that the pilaster elements dispose one on top of another and key-locked with mortar as blocks are laid into succeeding tiers in respective sections to form reinforcing and load bearing pilaster columns back of and the full height of each section which walls built of these blocks of a more permanent nature will withstand greater stresses and strains.

Another object of the invention is to provide a block molding machine, of the foregoing descriptions, with which building blocks are molded in a multiple of sizes at each operation, each block consisting a single face element back of which and integral thereto project flange elements at edges and a pilaster element intermediate its horizontal length with key-way depressions in its ends and a cavity in its back, with which blocks both exterior and partition walls are erected, each composing two sections that may be entirely separate and independent that such walls built of these blocks molded with this machine effect economies in materials and labor in making blocks and labor in handling and laying which permits building structures of these blocks of a more permanent nature within a lower cost range.

Another object of the invention is to provide a block molding machine, of the foregoing descriptions, with which building blocks are molded in a multiple of sizes at each operation, each block as previously specified, with a number of which blocks both exterior and partition walls are erected each wall composing two sections that may be entirely separate and independent and that walls can be erected of these blocks so that the pilaster columns back of each section dispose either in confronting or staggered relation to those in complementary sections. Therefore many thicknesses of walls can be erected of these blocks of a uniform depth and of a more permanent nature.

Another object of the invention is to provide a block molding machine, of the foregoing descriptions, with which building blocks are molded in a multiple of sizes at each operation, each block consisting elements and features as previously specified and that with this machine the exposed surfaces of blocks can be veneered with materials of any color, tint and texture so that both exterior and partition walls can be erected of these blocks each wall composing two sections that may be entirely separate and independent with a complete air chamber between and each section of any wall show a different color, tint or texture to that of its complement. Therefore walls can be erected of these blocks molded on this machine that are beautiful, both inside and out, without processing, stuccoing, furring, lathing, plastering, painting, papering or panelling, and if built of blocks varying in size of face elements the walls will not appear monotonous as would be expected of exposed blocks of a uniform face size.

Another object of the invention is to provide a block molding machine, of the foregoing descriptions, with which building blocks are molded in a multiple of sizes, each block consisting of elements and features as previously specified and that certain parts of the molding cradle are removable and replaceable and that some of the chamber parts are adjustable so that the elements and features of the blocks can be made many sizes, thicknesses and depths as may be desired that with such blocks molded on this machine both exterior and partition walls are built each wall composing two sections that may be entirely separate and independent of each other and that one section can be erected first as strong as necessary to carry loads (joists, floors, roofs, etc.) which can be placed thereon, installations (pipes, conduits, reinforcing stays installed and tightened between coping or plates and footing, heat insulating materials, etc. as desired to be concealed inside of wall) made and another section then erected merely as a curtain; such walls being more resistant to heat, cold, storms, earthquakes, fire and will be roomier and if these blocks built on this machine are veneered will be beautiful without processing, stuccoing, furring, lathing, plastering, painting, papering or panelling.

Another object of the invention is to provide a block molding machine, of the foregoing descriptions, with which building blocks, as herein specified, are molded at each operation and with which blocks both exterior and partition walls are built each wall composing two sections one section of which can be erected of these blocks, made on this machine, strong enough to carry loads (joists, floors, roofs, etc.) which can be placed thereon, installations (pipes, conduits, reinforcing stays, etc. as desired to be concealed inside wall) made and then heat insulating plaster boards or other materials secured to the load bearing section and boards or materials may be stuccoed, plastered, painted, papered or panelled and made to serve as the curtain section and that the blocks with which the load bearing section is built may be veneered any color, tint or texture and show various sized face elements that the section will need no stuccoing, furring, lathing, plastering, papering or panelling, will be comfortable, safe and beautiful at a cost within a lower range.

And yet another object of the invention is to provide a block molding machine, of the foregoing descriptions, with which building blocks, as specified above, are molded in a multiple of sizes at each operation; that are strong and yet light for transporting, handling and easy to lay; that can be veneered with materials of various colors and textures; with which both exterior and partition walls can be erected each wall composing two sections that may be entirely separate and independent with a complete air chamber between and any wall may be erected any practical thickness desired; that one section can be erected first to carry loads which can be placed thereon, installation as desired concealed within wall made and then another section erected of these blocks or insulation boards or other materials treated without building another section of blocks; that are reinforced with stays and pilaster elements key-locked with mortar forming reinforced pilaster columns back of each section; that walls built of these blocks are more beautiful, more comfortable, more resistant to storms, earthquakes and fires; that are stronger and safer; that walls built of these blocks molded on this machine need no processing, stuccoing, furring, lathing, plastering, painting, papering or panelling; that walls of building can be erected of these blocks adopted to more nearly universal purposes at an original cost and subsequent upkeep expenses within a lower range.

To illustrate the parts and their coordination in this invention and to show how the various functional mechanisms operate and serve to mold building blocks of the foregoing specifications and to set forth more clearly the objects and claims made herein the accompanying drawings are submitted as part of the specification, whereas:

Figure 1:
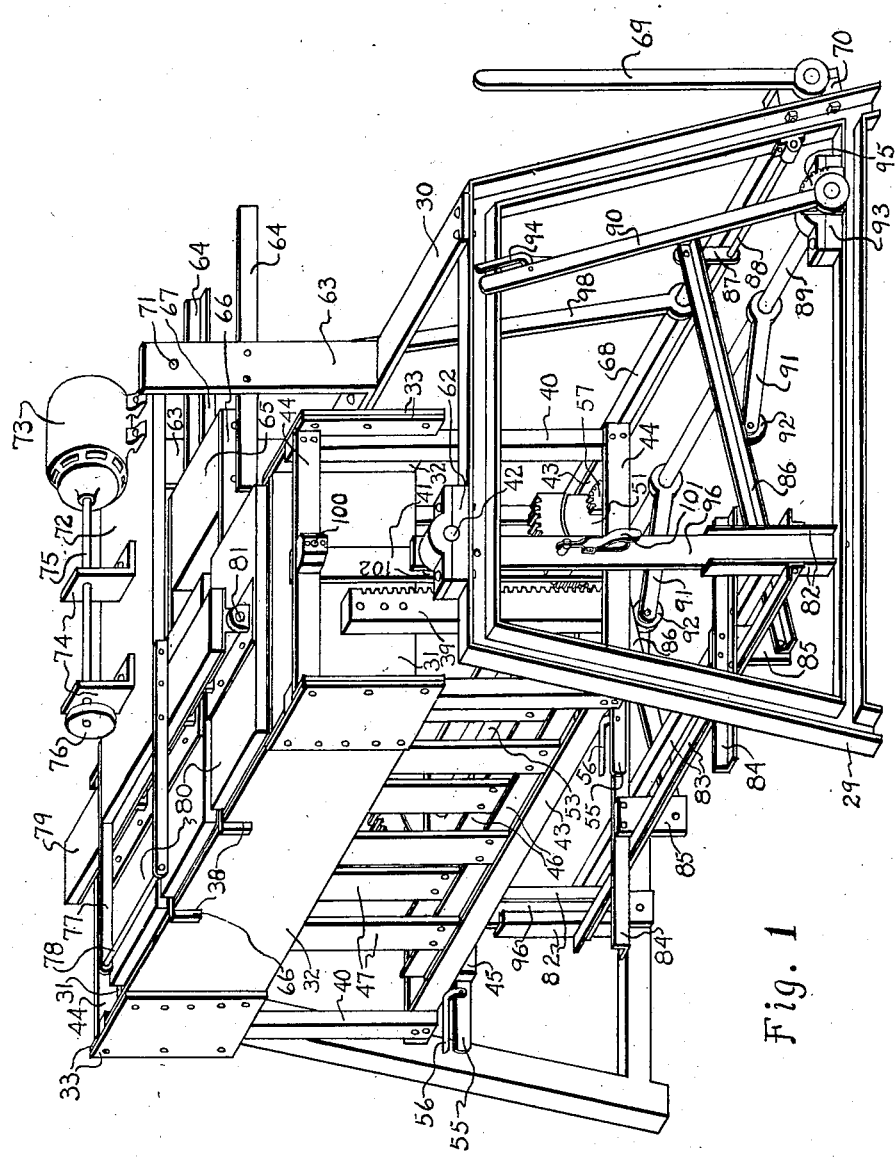
Figure 1 is an isometric view of this block molding machine showing the functional mechanisms at molding positions as seen from such a point of view.
Figure 2:
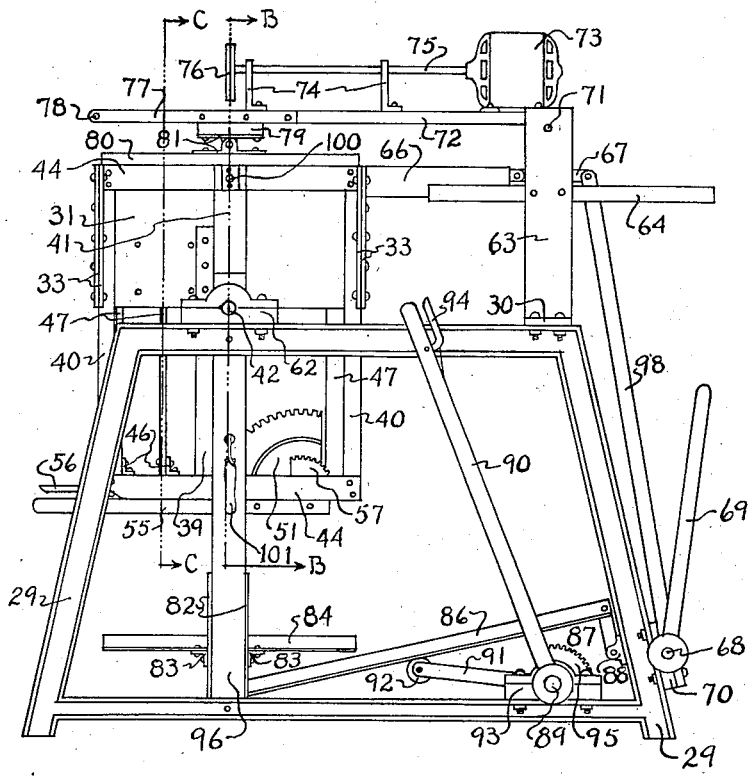
Figure 2 is a right end elevation of this block molding machine with all mechanisms at molding positions.
Figure 3:
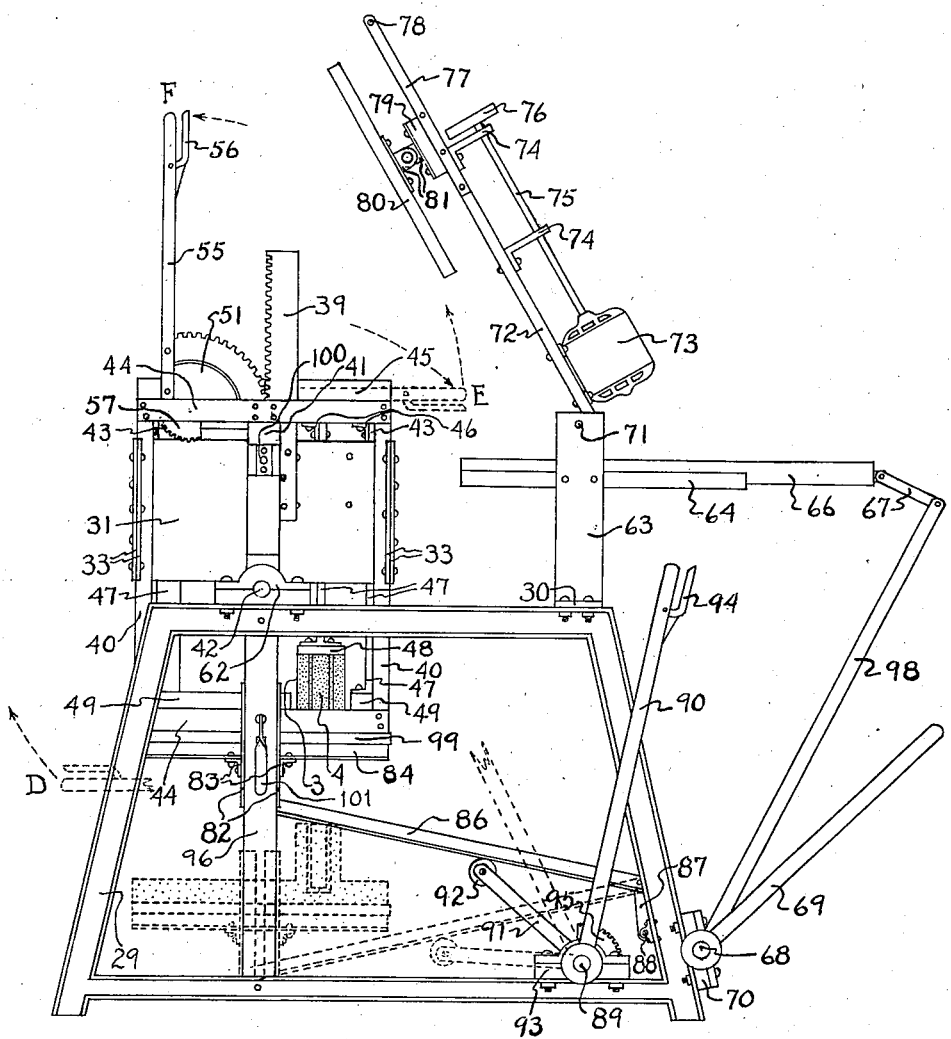
Figure 3 is a right end elevation of this block molding machine showing functional mechanisms at releasing positions after the materials have been placed and tamped into the molding chambers.
Figure 4:
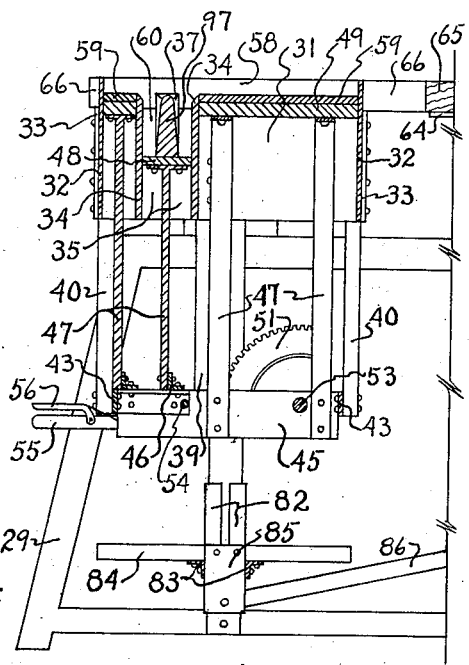
Figure 4 is sectional view of molding machine cut on line AA, Fig. 8, as seen from a right end point when all mechanisms shown are at molding positions.
Figure 5:
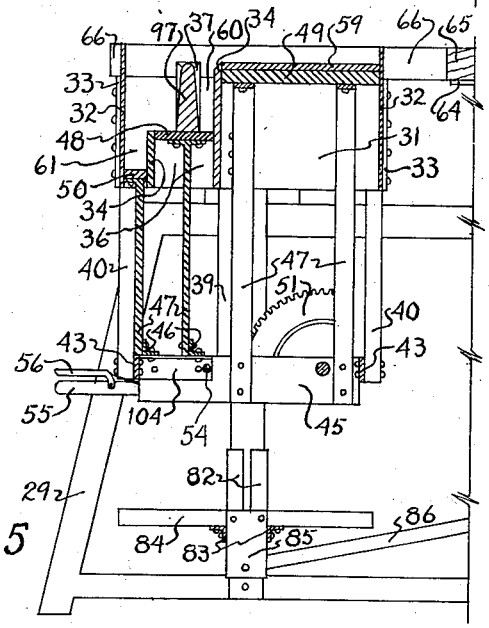
Figure 5 is a sectional view cut on line A—A, Fig. 8.
Figure 6:
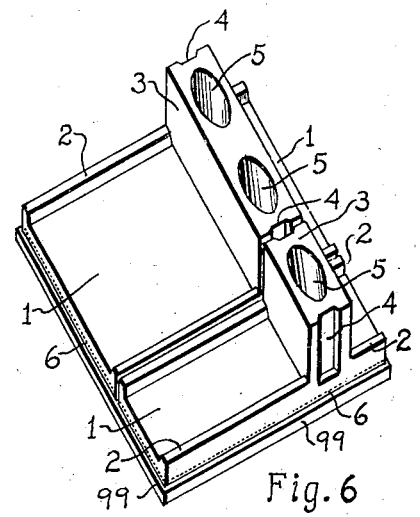
Figure 6 is an isometric view of a pallet of regular blocks as it appears upon removal from molding machine as molded in a multiple of sizes therewith.
Figure 7:
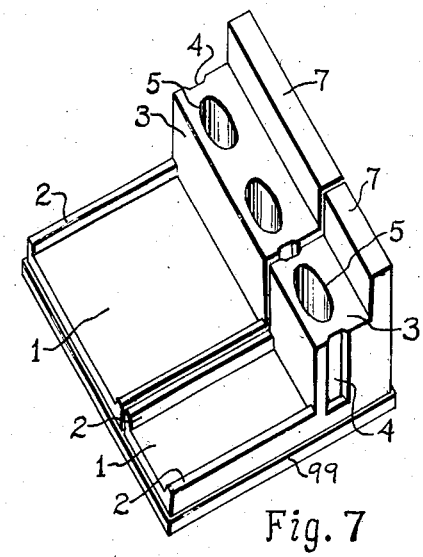
Figure 7 is an isometric view of a pallet of blocks for turning corners with an outer section of any wall as it appears upon removal from machine as molded in a multiple of sizes therewith.
Figure 8:
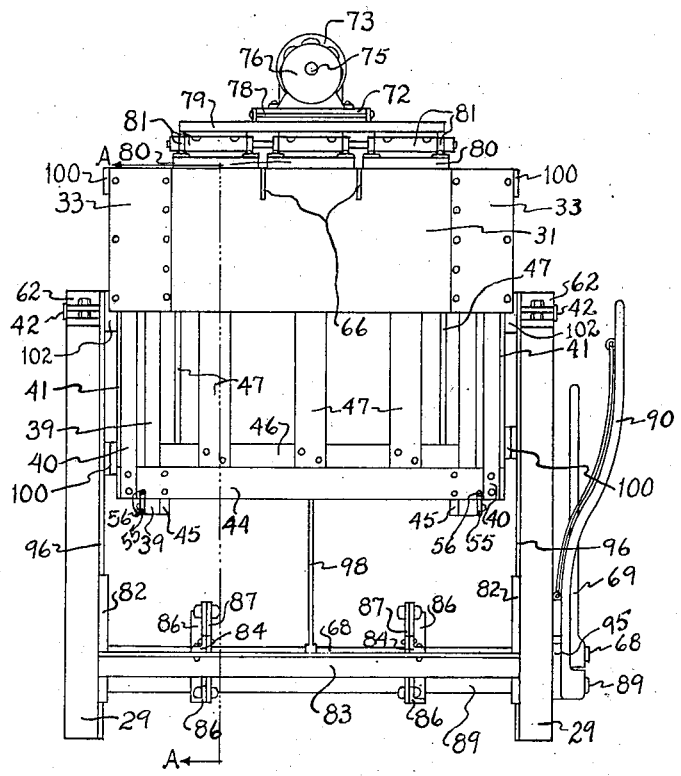
Figure 8 is a front elevation of the molding machine as it appears with functional mechanisms at molding positions.
Figure 9:
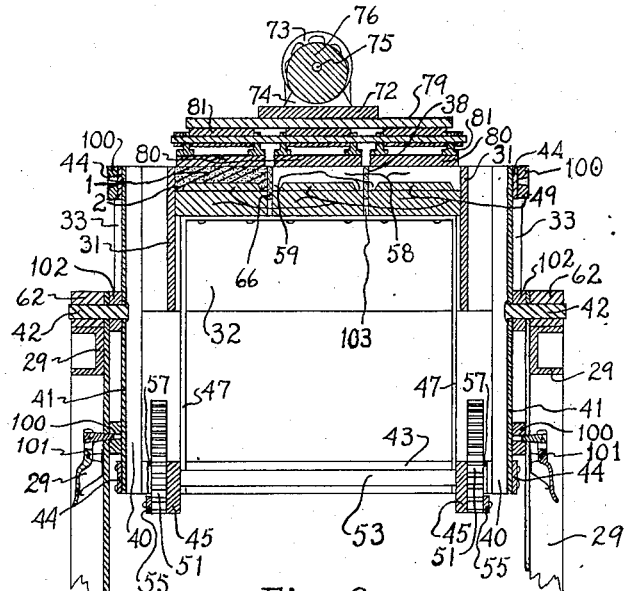
Figure 9 is a sectional view of the molding cradle and vibrator tamping apparatus cut on dotted line BB, Fig. 2 across the block chambers at their centres when the mechanisms shown are at molding positions.
Figure 10:
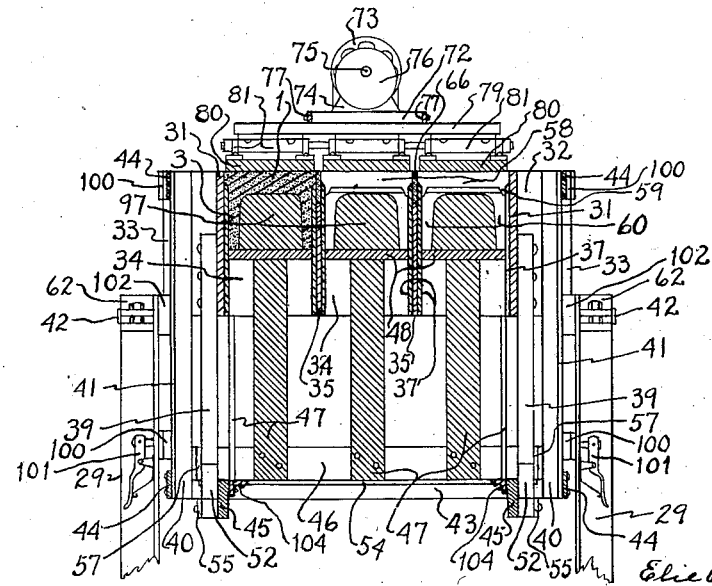
Figure 10 is a sectional view of the molding cradle and the vibrator tamping apparatus cut on dotted line C—C, Fig. 2 through the centres of pilaster chambers when the mechanisms shown are at molding positions.

To illustrate further and make clear the functions of the mechanisms and their parts as they relate to operations, objects and claims numerals are used to designate the various members, features and chambers of this block molding machine, the blocks molded therewith and walls erected of the blocks and it is understood that each number designates the same member, feature, element or chamber in all drawings:

The frame parts of this block molding machine, on which the other functional mechanisms are mounted, are the vertical sides 29 and any cross braces or stays 30 connecting vertical sides.

The parts, features, cores and chambers of the rotary molding cradle are housings 62 mounted on vertical frames in which journals 42 turn when cradle is revolved from molding to releasing positions and back, which journals pass through and are swaged in bosses 102 and supporting members 41 of rotate frame track to which supports are fastened at each end cross members 44 and at ends of these cross members are fastened guide posts 40 along which sleeve sides 32 and bearing plates 33 move to station sleeve mechanism in molding and releasing positions. At one end of each guide post are fastened front and back base members 43 of the horizontal swinging base. Between these front and back base members are fastened cross supports 45 that carry pinions 51 that are key-locked to shaft 53 and which support also ledges 104 which carry beams 46 that hold uprights 47 on which rest pilaster chamber bottom members 48, face-flange bottom members 49 and end chamber bottom members 50; also the cross supports (45) carry rack guide roller shaft 54 on which are guide rollers 52. Surrounding chamber bottom members and fitting snugly about them are sleeve end members 31, front and back sleeve sides 32 which form a movable box-sleeve inside of which and attached to are auxiliary pilaster element chamber sleeve members 34 between which the pilaster element separators 35 extent to which are attached key-way depression members 37, and when corner blocks are molded one or both of the auxiliary sleeve members can be removed and replaced by others and the pilaster element separators (35) replaced with end element separators 36 which separate both the pilaster element and end element chambers when molding a multiple of blocks at each operation. This sleeve mechanism is moved into both molding and releasing positions by racks 39 which are activated by pinions 51 to which are attached levers 55. When sleeve mechanism is moved along rotate frame track into molding position it forms face element 58, flange element 59 and pilaster element chambers 60 and in case of molding corner blocks the end element 61 is formed in addition to the regular chambers. When it is desired to move sleeve mechanism along rotate frame guides into either molding or releasing positions the pawl mechanism 56 unlocks lever from ratchets 57 and when sleeve is moved to position as desired are relocked thereby. Also when sleeve is locked at molding position the face-flange separators 66 are moved through slots 38 in edges of both box and auxiliary sleeves and along crevices 103 between chamber bottom members and over the pilaster element separators or in case of molding corner blocks over end element separator members. Fastened to guide frame track cross members (44) are fastened lock sockets 100 into which a pin mechanism 101 engages and holds the crade at either molding or releasing position. In case cavities in back of pilaster elements are desired cores 97 are attached on tops of the pilaster element chamber bottoms.

Mounted on frame back of rotary molding cradle is a face-flange separator device consisting uprights 63 that support the track members 64 along which moves the separator carriage composing separators (66) between which are spacers 65 which carriage is activated by a link 67 fastened to an arm 98 keyed to shaft 68 held by housings 70 secured to frame and on shaft is fastened a lever 69 for moving separators into and out of molding positions.

Mounted on the same uprights (63) as support the face-flange separator device is hinged a vibrator tamping mechanism consisting a shaft 71 to which a vibrator base 72 is hinged on which base are mounted upright bearing members 74 that carry a shaft 75 on which is keyed an eccentric fly-wheel 76 and a motor or pulley 73 that turns shaft. Beneath the vibrator base is fastened a bar 79 carrying hinges 81 to which are fastened swivelled tamping plates 80 that contact materials placed in molding chambers when the vibrator is brought down by handle, 78 attached to vibrator base by bars, 77.

Further mounted on the frame is a block lowering elevator that is disposed mainly beneath the rotary molding cradle and consists guide members, 82 to which are fastened trusses, 83 extending horizontally between guide members. Across these trusses are fastened struts, 84 that when elevator is raised contact underneath the pallet, 99 on which the blocks are released to be lowered. The struts are secured to vertical bars, 85 that are hinged to elevator lifting arms, 86 which arms in turn are swivelled to pendulum connecting links, 87 fastened to a shaft, 88. The elevator lifting arms are activated by rollers, 92 at ends of fulcrum arms, 91 that are keyed to a shaft, 89 to which are fastened a lever, 90 with a pawl mechanism, 94 that locks in a ratchet, 95 that locks elevator in position when raised. The shaft rotates in housings, 93 fastened to frame. The guides (82) are moved along vertical guide rails, 96 to both molding and releasing positions for elevator that finally releases blocks that are molded on this machine.

Having designated and described the principal parts, features and chambers of this block molding machine the processes of molding blocks thereon and releasing them are hereafter described.

With vibrator tamping apparatus raised, the rotary molding cradle and its sleeve mechanism stationed at molding positions, the face-flange separators engaged through slots in edges of sleeve members extending along crevices and over pilaster element separator members which completely form all element chambers for molding a multiple of building blocks into which chambers are placed plastic materials, the vibrator tamping apparatus brought down that the tamping plates contact the materials in each block compartment, the eccentric fly-wheel turned swiftly which produces both a horizontal settling and scouring as well as a vertical pounding motion that shakes, smears and pounds materials more compactly into molds; the tamper is then raised, the materials screeded to top of box-sleeve, pallet clipped against face elements of formed blocks by means of hand clamps belonging to the prior art, such as the well known C clamp. The face-flange separators should be withdrawn from between the face and flange elements, the cradle unlocked and turned to releasing position, elevator raised beneath and against pallet, pallet unclipped, sleeve mechanism moved up along its rotate frame track which movements clear all vertical edges of blocks leaving only the upside down cores and chamber bottoms of machine touching molded blocks which rest on pallet supported by the elevator; the elevator is then lowered carrying the pallet with blocks following thereon by gravity which pallet with blocks thereon is removed.

With this machine as described heretofore building blocks are molded in a multiple of sizes at each operation each block consisting of a single face element 1 back of which and integral thereto project flange elements 2 and a pilaster element 3 intermediate its horizontal length with key-way depressions 4 in its ends and a cavity 5 in its back and the face element may contain a thin veneer 6 of materials of another color or texture on the exposed surface and in cases of molding blocks for turning corners with an outer section an end element 7 exists at one end of each block. This end element may be of any color or texture as the veneer shows. All blocks may be veneered with this machine by stopping the sleeve just short of its normal molding position and filled and tamped with ordinary materials after which it is moved to normal leaving a subchamber that is filled with veneering materials which are tamped, screeded, troweled and processed, turned over and released as described above.

Having described the invention thus, what is claimed as new is:

1. A block molding machine comprising a frame, a rotary molding cradle rotatably mounted in the frame, a block forming box-sleeve slidably mounted in the molding cradle and an elevator adapted to move to and from the said cradle, said elevator being slidably mounted on the said frame.

2. A block molding machine comprising a frame, a rotary molding cradle rotatably mounted in the frame, a block forming box-sleeve slidably mounted in the molding cradle, an elevator adapted to move to and from the said cradle and a face flange separating means mounted on the frame including separating elements adapted to move into and out of the said block forming box-sleeve.

3. A block molding machine comprising a frame, a rotary molding cradle rotatably mounted in the frame, an elevator slidably mounted on the frame adapted to move to and from the cradle, said elevator being provided with an actuating means including a lifting arm pivotably mounted on the frame and a combined lever and fulcrum arm mechanism for raising the lifting arm provided with a roller for contacting the lifting arm.

4. A block molding machine comprising a frame, a rotary molding cradle rotatably mounted in the frame, a block forming box-sleeve slidably mounted in the said molding cradle and a vibrator tamping mechanism including a tamping plate adapted to contact material in the said block forming box-sleeve and a means for vibrating the said tamping plate.

5. A block molding machine comprising a frame, a rotary molding cradle rotatably mounted in the frame, a vibrator tamping mechanism including a tamping plate adapted to contact material in the said cradle and means for vibrating said tamping plate and an elevator slidably mounted on the said frame adapted to move to and from the said cradle.

6. A block molding machine comprising a frame, a rotary molding cradle rotatably mounted in the frame, a block forming box-sleeve slidably mounted in the molding cradle, a vibrator tamping mechanism including a tamping plate adapted to contact material in the said block forming box-sleeve and a means for vibrating the said tamping plate including a driving shaft and an eccentric flywheel mounted on the shaft.

7. The device as claimed in claim 6 including an elevator slidably mounted on the said frame and being adapted to move to and from the said rotary molding cradle said elevator being provided with a lifting arm pivotably mounted on the said frame and a combined lever and fulcrum arm mechanism mounted on the said frame for raising the lifting arm, said combined lever and fulcrum arm mechanism being provided with a roller for contacting the lifting arm.

8. The device as claimed in claim 1 including a means for moving the said block forming box-sleeve comprising a rack and a pinion meshed with the rack adapted to move the same.

9. The device as claimed in claim 2 including a means for moving the said block forming box-sleeve comprising a rack and pinion meshed with the rack adapted to move the same.

10. The device as claimed in claim 4 including a means for moving the said block forming box-sleeve comprising a rack and pinion meshed with the rack adapted to move the same.

11. The device as claimed in claim 6 including a means for moving the said block forming box-sleeve comprising a rack and pinion meshed with the rack adapted to move the same.

ELIE OWEN BLACKWELL.